(12) United States Patent
Browning et al.

(10) Patent No.: US 6,982,545 B2
(45) Date of Patent: Jan. 3, 2006

(54) ALTERNATOR SYSTEM WITH TEMPERATURE PROTECTED VOLTAGE REGULATOR

(75) Inventors: Reginald L. Browning, Orlando, FL (US); Juan Aguila, Miami, FL (US)

(73) Assignee: Wetherill Associates, Inc., Royersford, PA (US)

( * ) Notice: Subject to any disclaimer, the term of this patent is extended or adjusted under 35 U.S.C. 154(b) by 154 days.

(21) Appl. No.: 10/764,836

(22) Filed: Jan. 26, 2004

(65) Prior Publication Data

US 2005/0162135 A1 Jul. 28, 2005

(51) Int. Cl.
*H02P 9/18* (2006.01)

(52) U.S. Cl. .............................. 322/33; 322/28; 322/7; 322/46

(58) Field of Classification Search .................... 322/7, 322/22, 28, 33, 34, 37, 46
See application file for complete search history.

(56) References Cited

U.S. PATENT DOCUMENTS

| | | | | |
|---|---|---|---|---|
| 3,857,082 A | | 12/1974 | van Opijnen | 320/25 |
| 3,997,833 A | | 12/1976 | Boyama | 322/7 |
| 4,146,831 A | | 3/1979 | Farr | 322/94 |
| 4,431,959 A | | 2/1984 | Remmers | 320/59 |
| 4,439,721 A | | 3/1984 | Mura | 322/31 |
| 4,537,174 A | | 8/1985 | Nagasawa | 123/604 |
| 4,727,307 A | * | 2/1988 | Kaneyuki et al. | 322/22 |
| 4,781,166 A | | 11/1988 | Remmers | 123/597 |
| 4,958,119 A | * | 9/1990 | Fitzner | 322/91 |
| 5,078,627 A | | 1/1992 | Anderson | 440/1 |
| 5,160,881 A | * | 11/1992 | Schramm et al. | 322/7 |
| 5,182,510 A | | 1/1993 | Nakamura | 322/21 |
| 5,266,882 A | * | 11/1993 | Morishita | 322/28 |
| 5,298,842 A | * | 3/1994 | Vanek et al. | 318/473 |
| 5,298,852 A | * | 3/1994 | Meyer | 322/29 |
| 5,374,886 A | * | 12/1994 | Kohl et al. | 322/28 |
| 5,637,985 A | * | 6/1997 | Kakizaki et al. | 322/28 |
| 5,672,955 A | * | 9/1997 | Minks | 322/33 |
| 5,681,193 A | | 10/1997 | Pham et al. | 440/1 |
| 5,731,689 A | * | 3/1998 | Sato | 322/25 |
| 6,111,393 A | | 8/2000 | Regazzi et al. | 323/243 |
| 6,215,284 B1 | * | 4/2001 | Komurasaki et al. | 322/25 |

\* cited by examiner

*Primary Examiner*—Nicholas Ponomarenko
(74) *Attorney, Agent, or Firm*—Allen, Dyer, Doppelt, Milbrath & Gilchrist, P.A.

(57) ABSTRACT

An alternator system includes a permanent magnet alternator, battery and voltage regulator operatively connected to the permanent magnet alternator and battery for regulating the charging of the battery. The voltage regulator includes a rectifying circuit for rectifying the alternating current and a semiconductor switching element operative for turning the regulator on and off based on a predetermined temperature threshold to prevent overheating of any voltage regulator electronic components.

34 Claims, 7 Drawing Sheets

US 6,982,545 B2

ALTERNATOR SYSTEM WITH TEMPERATURE PROTECTED VOLTAGE REGULATOR

FIELD OF THE INVENTION

This invention relates to voltage regulators that regulate the voltage from a permanent magnet alternator, and more particularly, this invention relates to a temperature controlled voltage regulator used with a permanent magnet alternator system.

BACKGROUND OF THE INVENTION

Permanent magnet alternators, which can include similarly designed magneto alternators, have permanent magnets assembled on the inner walls of a rotor, for example, formed as a flywheel. The permanent magnet alternator may include a stator positioned inside the rotor or a flywheel magneto ignition system. Typically the stator has a plurality of coils that produce the alternating current, voltage and power used for charging, ignition and lighting systems. Different coils and magnets can be configured to increase alternator output, which includes a design known as a dual-rate alternator. Many of the permanent magnet alternators are single-phase and use one charging coil to output a single-phase AC wave through stator output terminals. The output frequency depends on the number of magnets assembled on the rotor. The similarly designed flywheel magneto ignition system uses a self-contained ignition system to deliver a high voltage spark.

Permanent magnet alternator systems are used on marine outboard motors, motorcycles and similar small engines. The voltage regulators used with such systems typically use open loop control instead of the more common closed loop control systems used on automobile systems. These open loop regulators are more simple, less complex, cost less, and thus, are more adapted to smaller outboard and motorcycle engines.

These regulators often include a rectifier circuit, for example, using silicon controlled rectifiers and a diode bridge circuit operative with the silicon controlled rectifiers. The alternator system, voltage regulator and battery could be designed to be series connected, or designed as a shunt system. A drawback of these regulators, however, was overheating. As engine RPM increases and the alternator spins at higher RPM's, the voltage increases, sometimes reaching as high as 250 volts peak, i.e., 500 volts peak-to-peak, causing extreme overheating and burn-up of the voltage regulator. Some proposed alternator systems, for example, in U.S. Pat. No. 5,078,627, have used a bimetallic switch that was operative to disable the voltage regulator and its rectifier and prevent excessive heating of any electronic components when the ambient temperature within the voltage regulator exceeded a predetermined value. A bimetallic or other mechanical switch, however, is not always reliable and it operates as a mechanical structure only. Bimetallic switches can easily fail depending on their design.

SUMMARY OF THE INVENTION

It is therefore an object of the present invention to provide an alternator system having a permanent magnet alternator, battery and a voltage regulator that overcomes the drawbacks of the prior art as indicated above.

It is yet another object of the present invention to provide an alternator system having permanent magnet alternator, battery and voltage regulator, which uses semiconductor components for compensating for higher temperatures that could damage regulator components.

The present invention is operative as a temperature controlled alternator system and includes a permanent magnet alternator through which an alternating current is output. A battery is operatively connected to the permanent magnet alternator and is charged therefrom. A voltage regulator is operatively connected to the permanent magnet alternator and battery for regulating the charging of the battery. The voltage regulator includes a rectifying circuit for rectifying the alternator current, and a semiconductor switching element operative for turning the regulator on and off based on a predetermined temperature threshold to prevent charging of the battery and overheating of any voltage regulator electronic components.

In one aspect of the present invention, the permanent magnet alternator includes a stator through which the alternating current is output. The permanent magnet alternator could also be a magneto type of alternator.

In yet another aspect of the present invention, the semiconductor switching element is formed as an integrated circuit temperature switch that outputs a logic signal when die temperature reaches a predetermined threshold. The semiconductor switching element is also operative for generating an active high, push-pull logic output. The rectifying circuit preferably comprises at least one silicon controlled rectifier and a diode bridge operative with the at least one silicon controlled rectifier. In one aspect of the present invention, the rectifying circuit comprises two silicon controlled rectifiers. A transistor logic circuit can be operative with the semiconductor switching element and operative for turning on and off the rectifying circuit, and in a preferred embodiment, by turning on and off any silicon controlled rectifiers.

In yet another aspect of the present invention, the voltage regulator comprises two stator terminals, a B+ and B− terminal, and a tachometer terminal. The voltage regulator is an open control loop voltage regulator and series connected with the permanent magnet alternator and voltage regulator. The predetermined temperature threshold can range from about 105° C. to about 120° C.

A method aspect of the present invention is also disclosed for regulating the output of a permanent magnet alternator by rectifying the alternating current output from the permanent magnet alternator within a voltage regulator operatively connected to the permanent magnet alternator. The method is operative by turning the regulator on and off based on a temperature threshold reached within a semiconductor switching element of the voltage regulator to prevent overheating of any voltage regulator electronic components.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention overcomes the disadvantages of voltage regulators operatively connected to permanent magnet alternators and batteries that regulate the charging of the battery and do not account for adequate temperature compensation. The present invention also overcomes the disadvantages of using mechanical switches, for example, bimetallic switches, as in some prior art voltage regulators. The voltage regulator of the present invention includes a rectifying circuit for rectifying alternating current, and a semiconducting switching element operative for turning the regulator on and off based on a predetermined temperature threshold to prevent charging of the battery and overheating of any voltage regulator electronic components.

For purposes of description, an existing alternator system using a permanent magnet alternator, battery and voltage regulator for an outboard marine motor will be described relative to FIGS. 1–3, followed by a description of the voltage regulator of the present invention.

Figure 1:
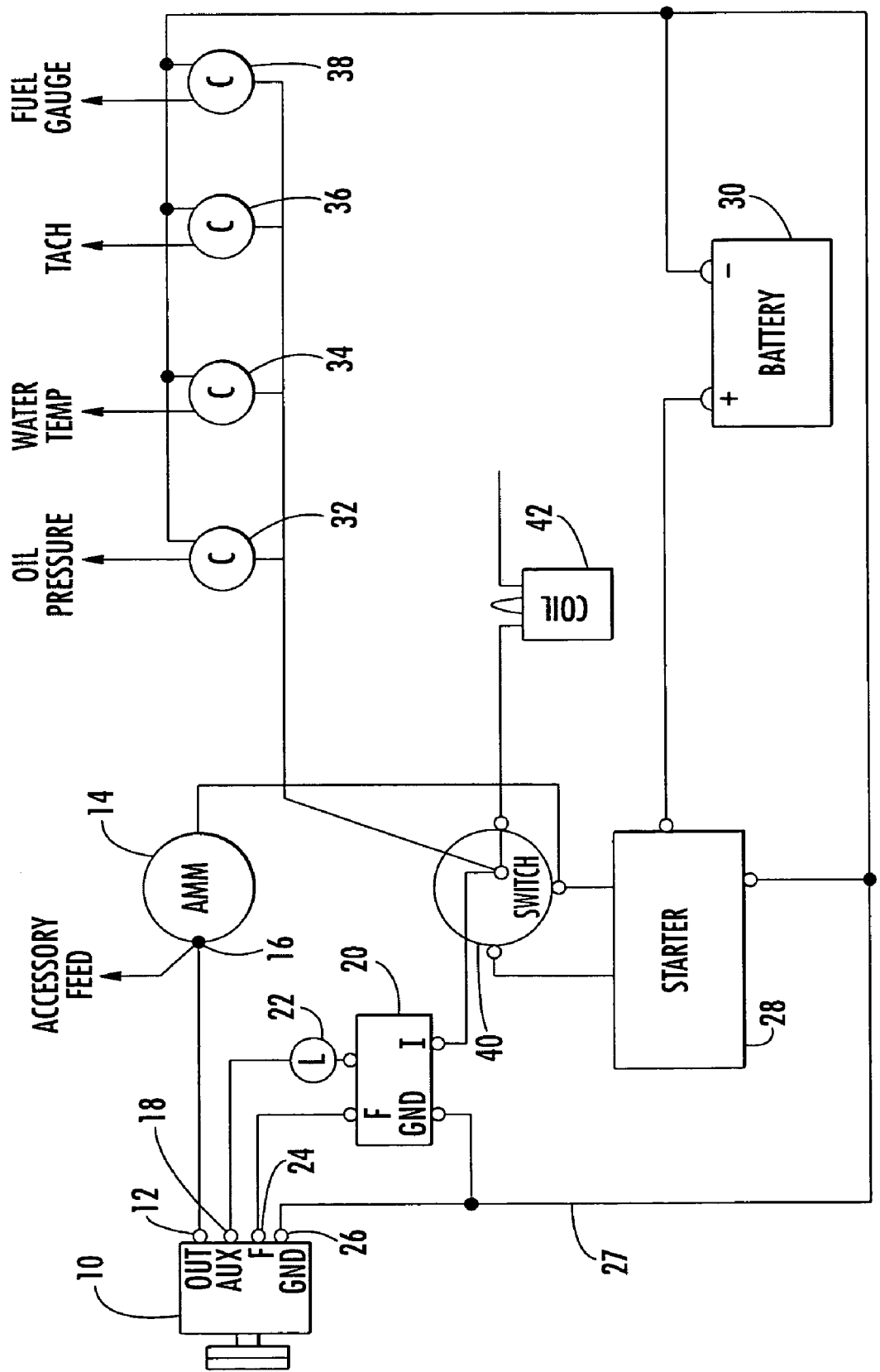
FIG. 1 is a schematic circuit diagram showing different electrical and electronic components used in an alternator system, for example, for an outboard marine or similar motor, and showing different electrical connections among the electrical and electronic component.

FIG. 1 shows a circuit diagram as an existing example of the type of wiring connections that can be used among electronic and electrical components used in an outdoor marine motor charging and ignition system. The system uses a permanent magnet alternator 10. This circuit can be modified for use with the present invention.

As illustrated, the alternator 10 includes an output terminal 12 connected to an ammeter 14 via an accessory feed terminal 16. An auxiliary output 18 connects to an ignition module 20 and charge light 22. An alternator AC output 24 as a field output connects to the ignition module 20. A ground output 26 connects to a ground connection 27, which also connects to the ignition module 20, a starter 28, battery 30, and a series of output components output signals for different functions. These components include an oil pressure component 32, water temperature component 34, tachometer component 36 and fuel gauge component 38. The starter 28 connects to the battery 30 as is typical. A coil 42 is connected to a start/ignition switch 40, which connects to the ignition module and starter 28. The marine engine wiring used for the electronic and electrical components in FIG. 1 can include an ignition switch controlled wire, ground wires, unprotected battery wires, overcurrent protected battery wires, alternator AC output and alternator field wires, bonding wires, alternator starter-to-ignition module wiring, alternator DC output and accessory feed wiring, oil pressure wiring, water temperature wiring, tachometer wiring, starting circuit wiring, and other ignition wiring as necessary.

Figure 2:
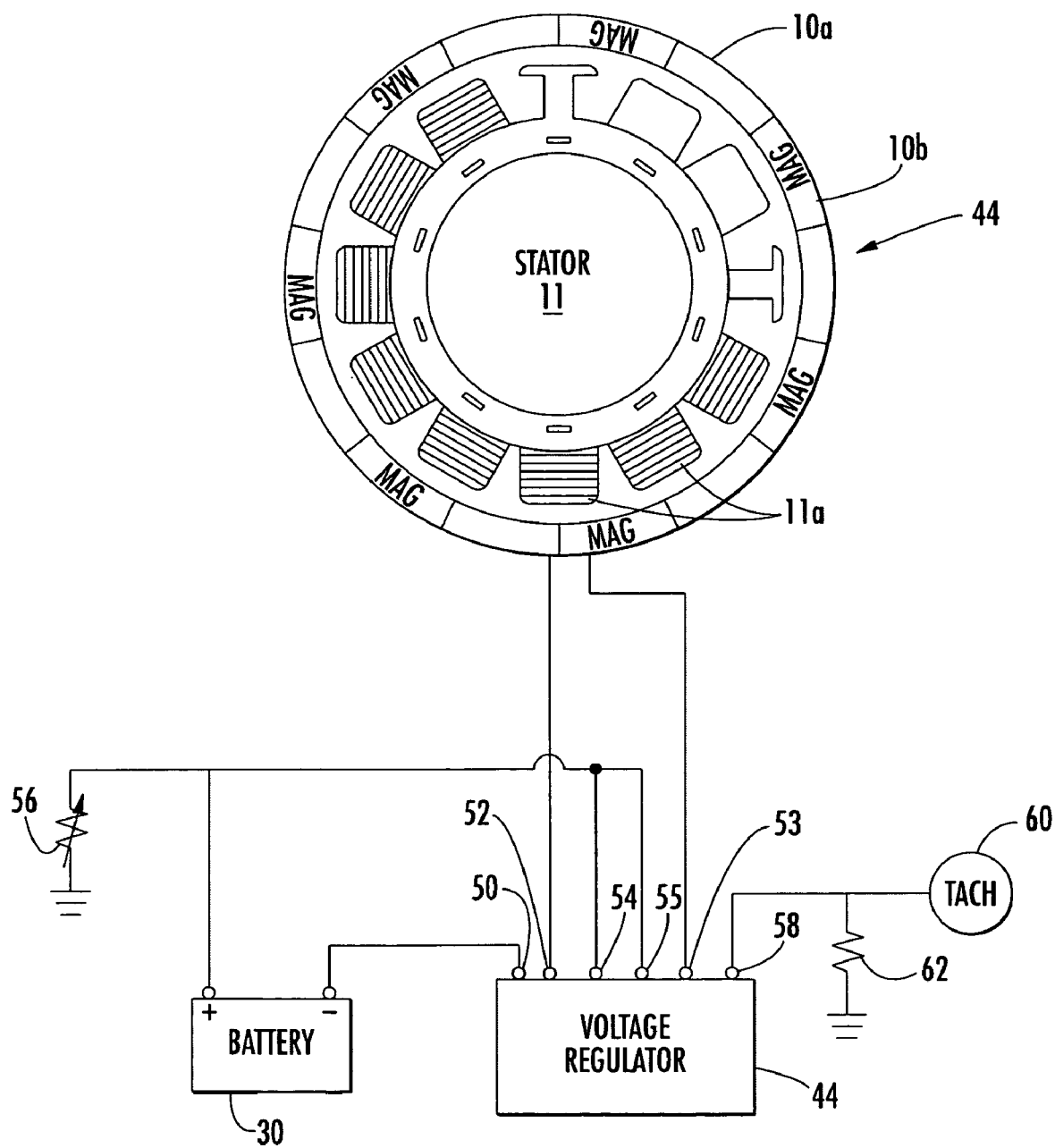
FIG. 2 is a fragmentary block diagram showing a permanent magnet alternator, battery, tachometer and voltage regulator and the connections among those components.

FIG. 2 shows a conventional alternator 10 and its connection to a voltage regulator 44, which can be operatively connected into the system shown in FIG. 1. The voltage regulator 44 includes six terminal connections, including a battery terminal 50 wired to the battery 30 and two stator terminals 52, 53 wired to the stator assembly of the permanent magnet alternator 10. Terminals 54,55 are wired to a resistive load bank 56 and positive battery terminal B+, and a tachometer terminal 58 is connected to a tachometer 60 and resistor 62. The alternator 10 includes a flywheel assembly 10a having permanent magnets 10b. A stator assembly 11 includes various coils 11a that can be designed for specific purposes as explained before.

Figure 3:
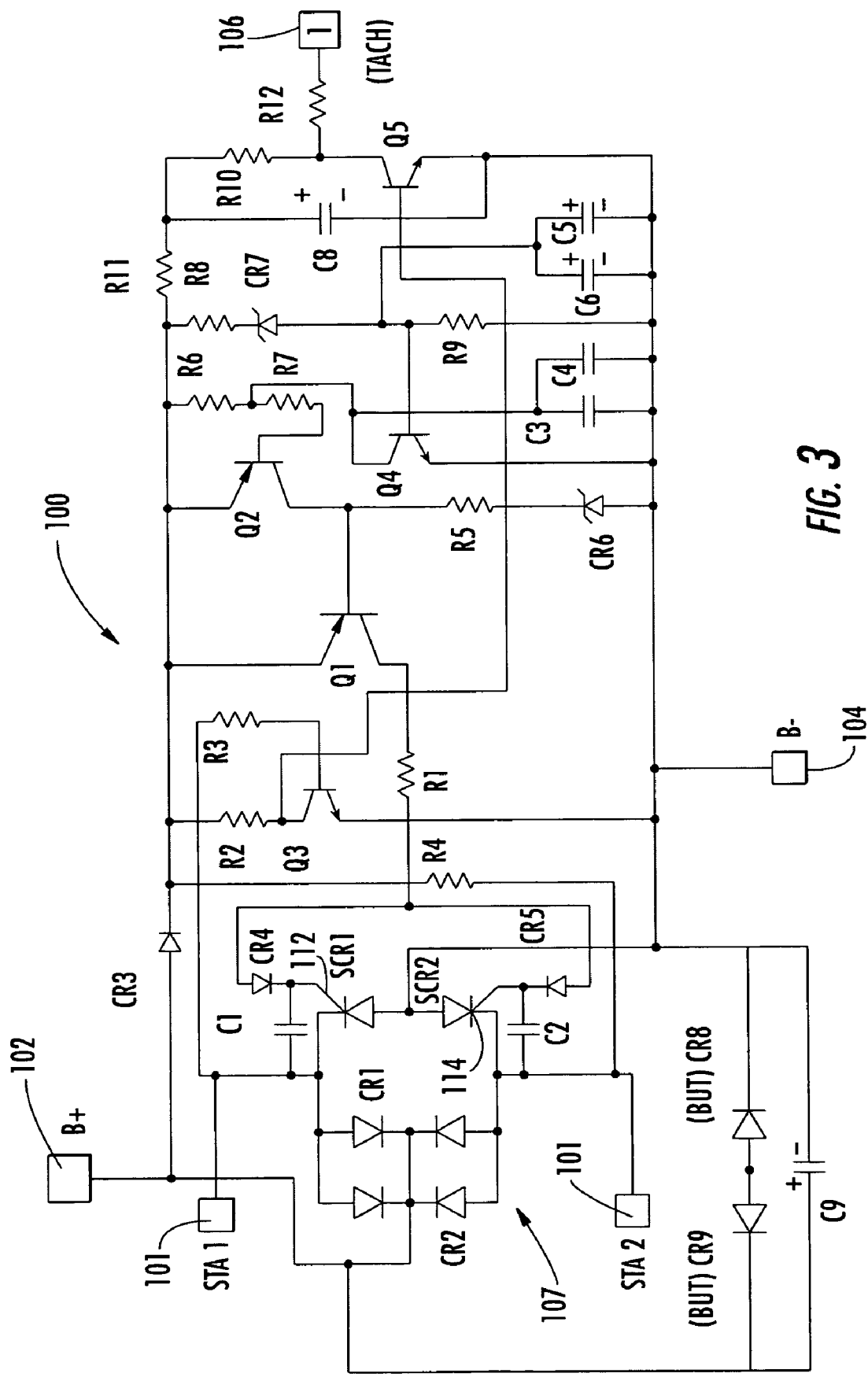
FIG. 3 is a schematic circuit diagram of a prior art voltage regulator used with a permanent magnet alternator, such as for an outboard marine motor.

The prior art regulator as described relative to FIG. 2 is shown in the schematic circuit diagram of FIG. 3 and can be mounted on a ⅛ by 6"×6" aluminum plate with fin side down and no thermal grease.

In the voltage regulator of the type shown in FIG. 3, with the regulating voltage at partial load, the average DC voltage on the output lead with respect to ground is about 14.4±0.4 volts. This is also a regulating voltage with no load. Before it drops across the regulator, it should not exceed 2 volts peak at the maximum current of 25 amps. When the tachometer lead is open, the regulator steady state current and the sense leads should not exceed 4 milliamps of 12.6 volts DC applied to it relative to ground.

FIG. 3 is a schematic circuit diagram of an existing voltage regulator used with a permanent magnet alternator system, such as shown in FIG. 1, and used, for example, in marine outboard motors. For purposes of description, reference numerals will begin in the 100 series.

As illustrated, the voltage regulator 100 includes two stator terminals 101, a B+ terminal 102, a B– terminal 104 and a tachometer terminal 106. A rectifying circuit 107 includes two silicon controlled rectifiers SCR1, SCR2 operatively connected at their inputs (gates) 112, 114 to respective diodes CR4, CR5 and capacitors C1, C2, forming part of the rectifying circuit 107. The gates 112, 114, are operatively connected to transistor Q1 and Q2 as illustrated for a transistor logic function. The silicon controlled rectifiers SCR1, SCR2 rectify the alternating current received through the stator terminals, and are also operative with four diodes positioned in a diode bridge configuration CR1 and CR2. Transistor Q3 is operatively connected to silicon controlled rectifiers as illustrated. A filtering circuit C3, C4, C5, C6 is associated with the tachometer terminal, as well as biasing transistor Q5. Zener diode CR7 provides a set point and is operative with calibration up and calibration down resistor circuit and transistor Q4. Zener CR6 provides an undervolt circuit. If the voltage drops below 7.2 volts, the circuit will shut down. Zener CR7 shuts the circuit on and off and is operative with the transistors Q1 and Q2 to gate the silicon controlled rectifiers to shut down the rectifier and the regulator.

Figure 4:
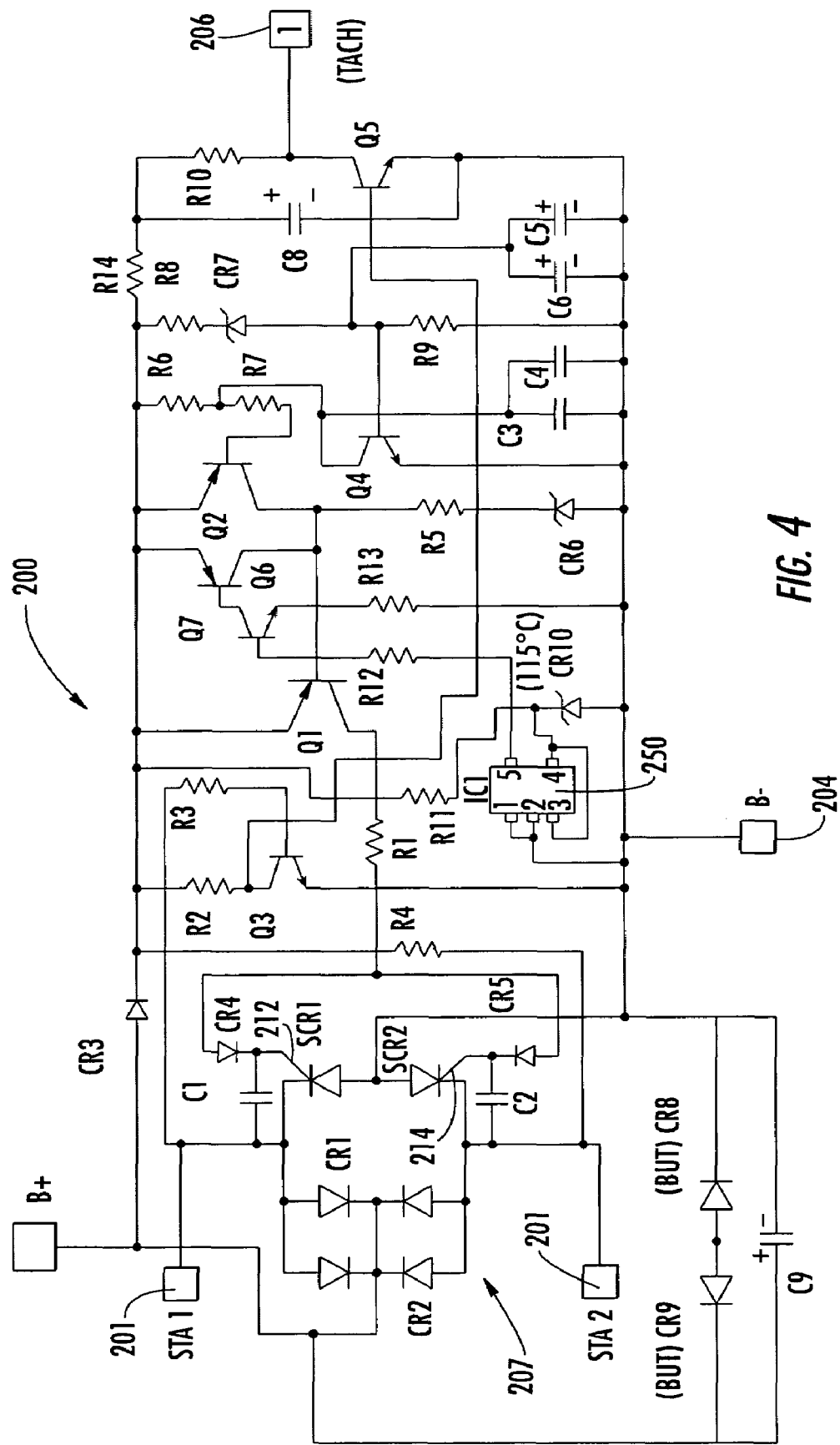
FIG. 4 is a schematic circuit diagram of a voltage regulator of the present invention showing a circuit similar to that shown in FIG. 3, but also including a semiconductor switching element operative for turning the regulator on and off based on a predetermined temperature threshold.

FIG. 4 shows a schematic circuit diagram of the voltage regulator 200 of the present invention and showing a semiconductor switching element 250 operative for turning the regulator on and off based on a predetermined temperature threshold to prevent charging of the battery and overheating of any voltage regulator electronic components. For purposes of description, reference numerals begin in the 200 series with common elements existing in the circuits of FIGS. 3 and 4 given the same reference numeral, except numerically beginning in the 200 series.

The semiconductor switching element 250 is formed as an integrated circuit temperature switch that outputs a logic signal when die temperature reaches a predetermined threshold through Pin 5 to transistors Q6 and Q7 and operative to terminate regulator operation. When the pulse from Pin 5 is received in a normal operating condition, the circuit looks open. The switching element 250 can generate an active high, push-pull logic output. The circuit includes a Zener CR10 operative with the device 250.

One type of micropower temperature switch 250 that can be used with the present invention is a MAX6502 integrated circuit produced by Maxim Corporation. This temperature switch produces a logic signal when a die temperature crosses a factory-program threshold. It has a programmed temperature trip threshold for −45° C. to +115° C. in 10° C. increments. It operates from +2.7 volt to +5.5 volt supply. It has no external components and consumes about 30 micro amp supply current. It has two on-chip, temperature-dependent voltage references and a comparator. It can be produced in SOT 23-5 and TO 220-7 packages. It includes a push-pull output. It is pin-selectable at +2° C. or +10° C. Hysteresis. A push-pull output can drive fan-controlled logic.

In the two temperature-dependent references and comparator, one reference has a positive temperature coefficient and the other a negative temperature coefficient. The trip point is determined when the two reference voltages are equal at a specific temperature. The +2° C. or +10° C. Hysteresis keeps the output from oscillating when a die temperature approaches a threshold temperature.

The MAX6502 circuit includes pins 1, 2, 3, 4 and 5 and operative as shown in FIG. 4. Pins 1 and 2 can be ground and not internally connected as shown by their connection to ground. Both ground pins can be tied together close to the chip. Pin 2 can provide a low thermal resistance to the die. Pin 3 can be a Hysteresis terminal and connected for +2° C. Hysteresis or connected to Vcc for +10° C. Hysteresis. As shown in the circuit diagram of FIG. 4, Pin 3 is connected to Pin 4 and CR10. Pin 4 can be Vcc for a supply input of +2.7 volts to +5.5 volts. Pin 5 can be a TOVER terminal as a push-pull active-high output. The TOVER goes high when the die temperature exceeds the programmed temperature threshold.

Figure 5A:
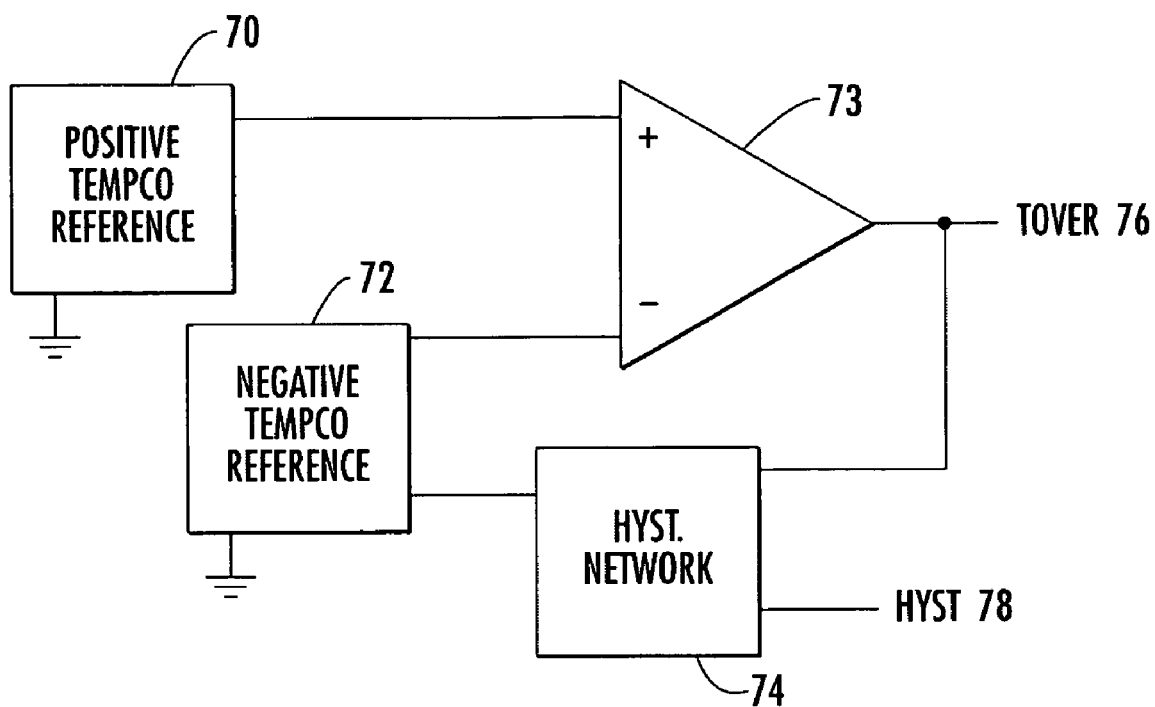
FIG. 5A is a block diagram showing basic functional parts of the integrated circuit temperature switch that can be used in the present invention.
Figure 5B:
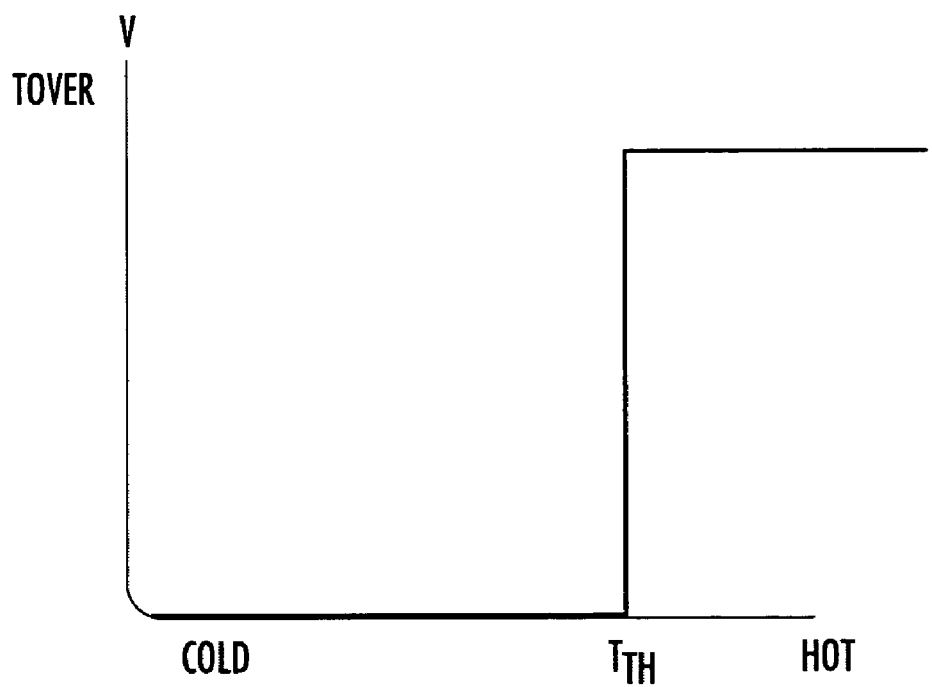
FIG. 5B is a graph illustrating operation of the temperature switch of FIG. 5A when a predetermined temperature threshold is reached.

FIG. 5A is a schematic block diagram of an example of functional elements of the temperature controlled switch operation, and showing a positive temperature reference 70 and negative temperature reference 72 connected to comparator 73. The negative temperature reference 72 connects to the Hysteresis network 74 with the TOVER and Hysteresis (HYST) output 76, 78. This type of circuit can drive a high-impedance load and dissipate negligible power. FIG. 5B is a graph showing the pulse output when a predetermined threshold temperature is reached.

A thermal performance table shown below illustrates basic operational characteristics of an original equipment (OE) voltage regulator having a circuit similar to the schematic circuit diagram of FIG. 3 and compared with a voltage regulator of the present invention having a circuit similar to that shown in the schematic circuit diagram of FIG. 4.

THERMAL PERFORMANCE TABLE

| DEVICE UNDER TEST | LOAD (AMPS) (IL) | TEMPERATURE (° C.) 1/ | | | DELTA TEMP (° C.) | | ° C./IL 4/ | ° C./W 4/ |
|---|---|---|---|---|---|---|---|---|
| | | AMBIENT (TA) | JUNCTION (TJ) 2/ | CASE/HS (TC) 3/ | (TJ − TA) (OJA) | (TS − TC) (OJC) | | |
| FIG. 4 Present Invention | 5 | 25 | 49.6 | 39.5 | 24.6 | 10.1 | | |
| | 10 | | 74.0 | 52.5 | 49.0 | 21.5 | | |
| | 15 | | 99.0 | 65.5 | 74.0 | 33.5 | | |
| | 20 | | 122.0 | 78.5 | 97.0 | 43.5 | | |
| | 5 | 50 | 74.3 | — | 24.3 | — | | |
| | 10 | | 99.3 | — | 49.3 | — | | |
| | 15 | | 122.0 | — | 72.0 | — | 4.88 | 0.35 |
| OE (Original Equipment) FIG. 3 | 5 | 25 | 49.9 | 39.6 | 24.9 | 10.3 | | |
| | 10 | | 73.5 | 52.0 | 48.5 | 21.5 | | |
| | 15 | | 97.0 | 63.6 | 72.0 | 33.4 | | |
| | 20 | | 121.0 | 78.1 | 96.0 | 42.9 | | |
| | 5 | 50 | 74.8 | — | 24.8 | — | | |
| | 10 | | 97.8 | — | 47.8 | — | | |
| | 15 | | 121.3 | — | 71.3 | — | 4.85 | 0.35 |

NOTES:

1/ Test Conditions - Test units were mounted to a 6" × 6" × 1.25" unpainted isolated aluminum plate and placed in a temperature controlled chamber. The chamber ambient air temperature was maintained within ±2° C. for all tests. Device stimulus was provided by a magneto/flywheel assembly spinning at 6000 RPM (peak stator voltages of 235 V). Both test units were full up (potted) assemblies.

2/ For the Transpo module, Junction Temperature (TJ) was measured (thermocouple) at the SCR anode to ceramic substrate junction. For the O.E. Junction temperature was measured at the SCR (1 of 2) anode lead to PC board junction (small area of potting removed, thermocouple attached, then potting refilled).

3/ Case/Heatsink temperature was measured at the housing to plate junction.

-continued

| | | THERMAL PERFORMANCE TABLE | | | | | |
|---|---|---|---|---|---|---|---|
| DEVICE | LOAD | TEMPERATURE (° C.) 1/ | | | DELTA TEMP (° C.) | | |
| UNDER TEST | (AMPS) (IL) | AMBIENT (TA) | JUNCTION (TJ) 2/ | CASE/HS (TC) 3/ | (TJ − TA) (OJA) | (TS − TC) (OJC) | ° C./IL 4/ | ° C./W 4/ |

4/ ° C./IL is the junction to ambient temperature rise per load amperage (averaged) ° C./W is the junction to ambient temperature rise per load wattage (averaged)

Figure 6:
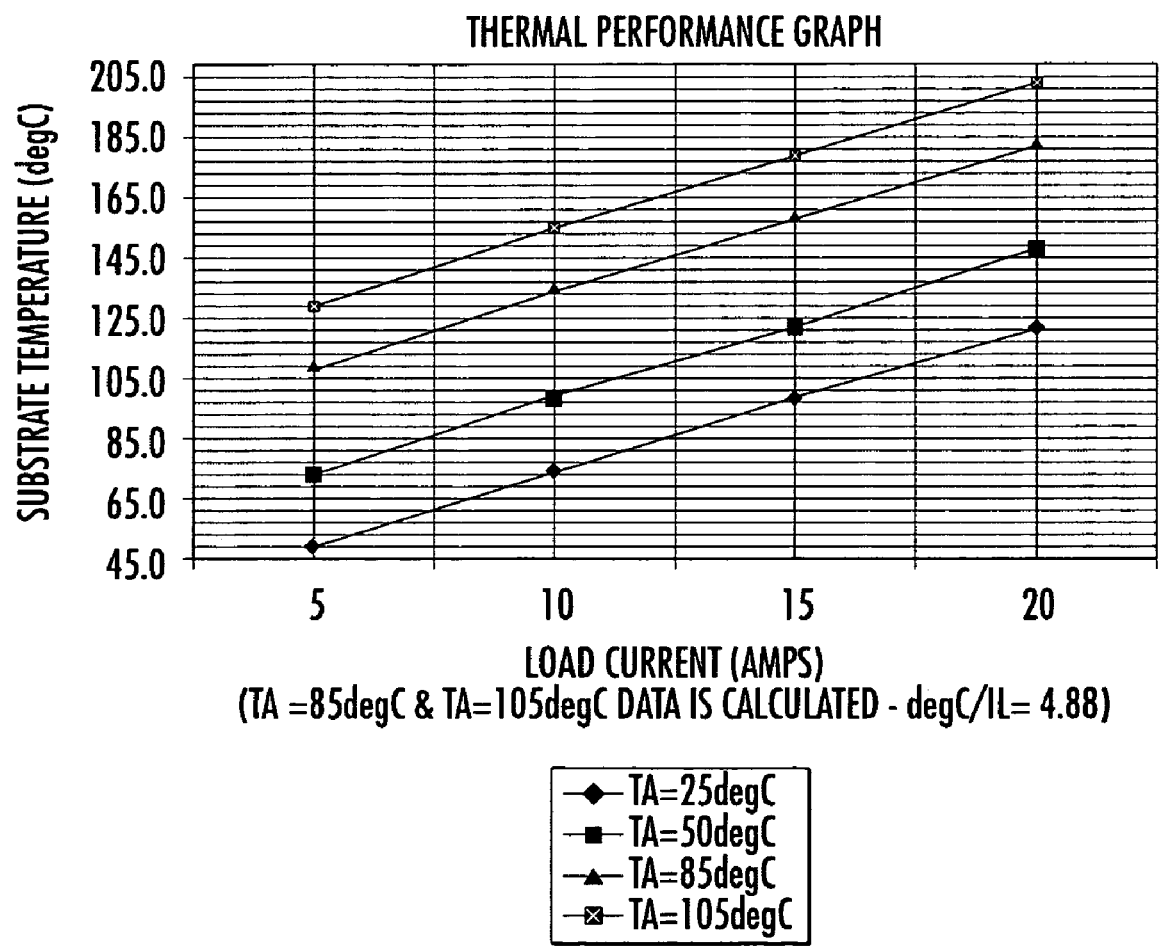
FIG. 6 is a graph depicting thermal performance of the voltage regulator of the present invention based on different temperatures.

FIG. 6 is a graph showing regulator performance results using a voltage regulator of the present invention. The 105° C. is shown in this example as a desired operational range.

Figure 7:
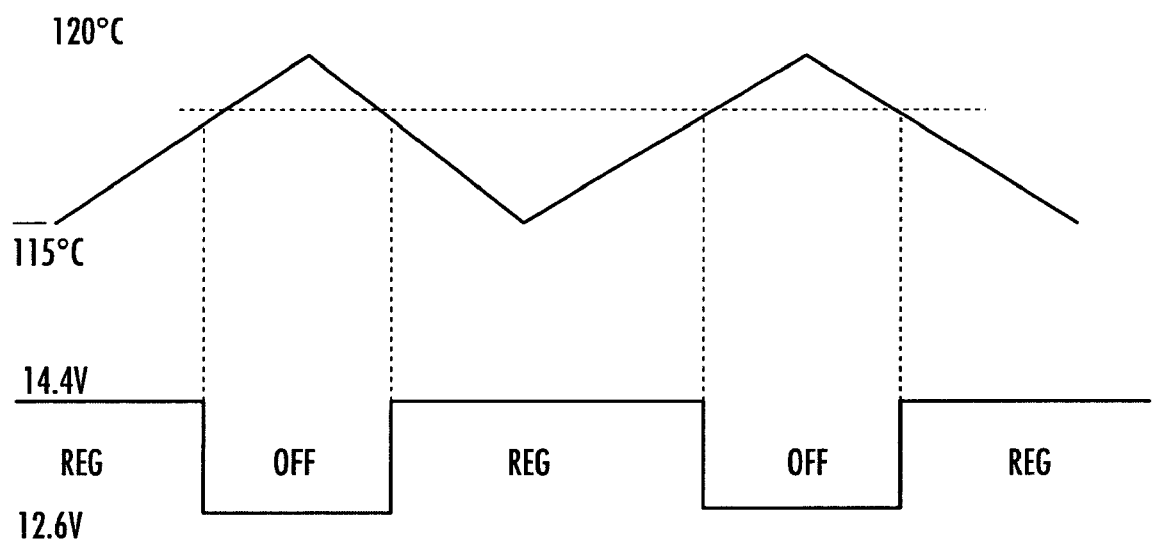
FIG. 7 is a diagram showing the regulator functioning in off and on condition based on reaching a predetermined temperature threshold.

FIG. 7 shows a graph with the temperature varying between 115° C. and 120° C. and showing regulator operation existing between on and off conditions relative to a predetermined temperature threshold. In one aspect of the present invention, it has been found that the cycling can be about 0.1 Hertz (Hz). Components can be mounted using ceramic technology, including green tape or similar co-fired ceramic technology for a substrate in the present invention.

It is evident that the present invention now provides an alternator system having a permanent magnet alternator, such as having a stator through which alternating current is output, a battery and temperature controlled voltage regulator that uses a semiconductor switching element, which is operative for turning the regulator on and off based on a temperature threshold to prevent charging of the battery and overheating of any voltage regulator electronic components. The present invention is advantageous over mechanical switches that can fail and are not as accurate.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An alternator system comprising:
   a permanent magnet alternator for producing an alternating current;
   a battery operatively connected to said permanent magnet alternator to be charged therefrom; and
   a voltage regulator operatively connected to said permanent magnet alternator and battery for regulating the charging of said battery, said voltage regulator including a rectifying circuit for rectifying the alternating current, and a semiconductor switching element operative for turning the regulator on and off based on a predetermined temperature threshold to prevent overheating of any voltage regulator electronic components.

2. The alternator system according to claim 1, wherein said semiconductor switching element comprises an integrated circuit temperature switch that outputs a logic signal when die temperature reaches a predetermined threshold.

3. The alternator system according to claim 1, wherein said semiconductor switching element is operative for generating an active high, push-pull logic output.

4. The alternator system according to claim 1, wherein said rectifying circuit comprises at least one silicon controlled rectifier.

5. The alternator system according to claim 1, and further comprising a diode bridge circuit operative with said at least one silicon controlled rectifier.

6. The alternator system according to claim 1, and further comprising a push-pull transistor circuit operative with said semiconductor switching element and operative for turning on and off said rectifying circuit after receiving a signal from said semiconductor switching element.

7. The alternator system according to claim 1, wherein said rectifying circuit comprises two silicon controlled rectifiers.

8. The alternator system according to claim 1, wherein said voltage regulator comprises two stator terminals.

9. The alternator system according to claim 1, wherein said voltage regulator comprises a B+ and B− terminal.

10. The alternator system according to claim 1, wherein said voltage regulator comprises a tachometer terminal.

11. The alternator system according to claim 1, wherein said voltage regulator comprises an open control loop voltage regulator.

12. The alternator system according to claim 1, wherein said voltage regulator, battery and said permanent magnet alternator are series connected.

13. The alternator system according to claim 1, wherein said alternator comprises a flywheel and permanent magnets carried by said flywheel.

14. The alternator system according to claim 1, wherein said predetermined temperature threshold is about 105 to about 120 degrees Celsius.

15. The alternator system according to claim 1, wherein said semiconductor switching element is operative for cycling at about 0.05 to about 0.2 Hz.

16. A voltage regulator for operatively connecting to a permanent magnet alternator, and including B+ and B− terminals, said voltage regulator further comprising a rectifying circuit for rectifying any alternating current received from a permanent magnet alternator, and a semiconductor switching element operative for turning the regulator on and off based on a predetermined temperature threshold and preventing any overheating of voltage regulator electronic components.

17. The voltage regulator according to claim 16, wherein said semiconductor switching element comprises an integrated circuit temperature switch that outputs a logic signal when die temperature reaches a predetermined threshold.

18. The voltage regulator according to claim 16, wherein said semiconductor switching element is operative for generating an active high, push-pull logic output.

19. The voltage regulator according to claim 16, wherein rectifying circuit comprises at least one silicon controlled rectifier.

20. The voltage regulator according to claim 19, and further comprising a diode bridge circuit operative with said at least one silicon controlled rectifier.

21. The voltage regulator according to claim 16, and further comprising a push-pull transistor circuit operative with said semiconductor switching element and operative for turning on and off said rectifying circuit.

22. The voltage regulator according to claim 16, wherein said rectifying circuit comprises two silicon controlled rectifiers.

23. The voltage regulator according to claim 16, and further comprising two stator terminals.

24. The voltage regulator according to claim 16, and further comprising a B+ and B− terminal.

25. The voltage regulator according to claim 16, and further comprising a tachometer terminal.

26. The voltage regulator according to claim 16, wherein said voltage regulator comprises an open control loop voltage regulator.

27. The voltage regulator according to claim 16, wherein said voltage regulator is operative to be connected in series to a battery and permanent magnet alternator.

28. The voltage regulator according to claim 16, wherein said predetermined temperature threshold is about 105 to about 120 degrees Celsius.

29. The voltage regulator according to claim 16, wherein said semiconductor switching element is operative for cycling at about 0.05 to about 0.2 Hz.

30. A method of regulating the output of a permanent magnet alternator comprising the steps of:
    rectifying the alternating current output from the permanent magnet alternator within a voltage regulator that is operatively connected to the permanent magnet alternator; and
    turning the regulator on and off based on a temperature threshold reached within a semiconductor switching element contained within the voltage regulator to prevent overheating of any voltage regulator electronic components.

31. A method according to claim 30, and further comprising the step of outputting a logic signal from an integrated circuit temperature switch when die temperature reaches a predetermined threshold.

32. A method according to claim 30, and further comprising the step of generating an active high, push-pull logic output.

33. A method according to claim 30, and further comprising the step of turning on and off at least one silicon controlled rectifier.

34. A method according to claim 30, wherein said temperature threshold is about 105 to about 120 degrees Celsius.

* * * * *